US012375981B2

(12) United States Patent
Selvaganapathy et al.

(10) Patent No.: US 12,375,981 B2
(45) Date of Patent: Jul. 29, 2025

(54) EARLY MEASUREMENTS FOR PSCELL ADDITION AFTER HANDOVER

(71) Applicant: NOKIA TECHNOLOGIES OY, Espoo (FI)

(72) Inventors: Srinivasan Selvaganapathy, Bangalore (IN); Elena Virtej, Espoo (FI); Jarkko Tuomo Koskela, Oulu (FI); Amaanat Ali, Espoo (FI); Tero Henttonen, Espoo (FI); Jedrzej Stanczak, Wroclaw (PL); Ahmad Awada, Munich (DE); Lars Dalsgaard, Oulu (FI)

(73) Assignee: Nokia Technologies Oy, Espoo (FI)

( * ) Notice: Subject to any disclaimer, the term of this patent is extended or adjusted under 35 U.S.C. 154(b) by 358 days.

(21) Appl. No.: 18/019,207

(22) PCT Filed: Jul. 12, 2021

(86) PCT No.: PCT/EP2021/069309
§ 371 (c)(1),
(2) Date: Feb. 1, 2023

(87) PCT Pub. No.: WO2022/028814
PCT Pub. Date: Feb. 10, 2022

(65) Prior Publication Data
US 2023/0308960 A1    Sep. 28, 2023

(30) Foreign Application Priority Data

Aug. 6, 2020    (IN) .............................. 202041033720

(51) Int. Cl.
*H04W 36/00*    (2009.01)
(52) U.S. Cl.
CPC ... *H04W 36/0061* (2013.01); *H04W 36/0058* (2018.08); *H04W 36/00692* (2023.05)

(58) Field of Classification Search
CPC ......... H04W 36/0061; H04W 36/0058; H04W 36/00692; H04W 36/0085; H04W 36/0069
See application file for complete search history.

(56) References Cited

U.S. PATENT DOCUMENTS

| 2013/0336153 A1 | 12/2013 | Liang |
| 2014/0106757 A1 | 4/2014 | Hakola et al. |

(Continued)

FOREIGN PATENT DOCUMENTS

| CN | 102884829 A | 1/2013 |
| CN | 110741679 A | 1/2020 |

(Continued)

OTHER PUBLICATIONS

Office action received for corresponding Japanese Patent Application No. 2023-507938, dated May 1, 2024, 2 pages of office action and 5 pages of summary and translation available.

(Continued)

*Primary Examiner* — Hashim S Bhatti
(74) *Attorney, Agent, or Firm* — Barta Jones, PLLC

(57) ABSTRACT

Inter-alia, a method is disclosed comprising: obtaining measurement configuration information indicative of a measurement configuration for a measurement on at least one target secondary cell of a mobile communication network, executing a handover to a target cell, and, before and/or during executing the handover, starting a measurement on at least one target secondary cell based, at least in part, on the measurement configuration information. Further, a method is disclosed comprising: receiving, from a target node, target secondary cell information indicative of at least one target secondary cell, upon reception of the target secondary cell information, transmitting a measurement configuration information indicative of a measurement configuration for a measurement on at least one target secondary cell based, at (Continued)

least in part, on the target secondary cell information. It is further disclosed an according apparatus, a computer program and a system.

18 Claims, 9 Drawing Sheets

(56) References Cited

U.S. PATENT DOCUMENTS

| | | | |
|---|---|---|---|
| 2017/0055187 A1* | 2/2017 | Kang | H04W 36/0058 |
| 2017/0318505 A1 | 11/2017 | Park et al. | |
| 2020/0154326 A1 | 5/2020 | Deenoo et al. | |
| 2021/0352543 A1* | 11/2021 | Purkayastha | H04W 76/11 |
| 2022/0369173 A1* | 11/2022 | Deng | H04W 36/00692 |
| 2023/0007552 A1* | 1/2023 | Sun | H04W 76/15 |
| 2023/0079242 A1* | 3/2023 | Xu | H04W 76/27 370/331 |
| 2023/0171652 A1* | 6/2023 | Zhang | H04W 36/0061 370/331 |

FOREIGN PATENT DOCUMENTS

| | | |
|---|---|---|
| EP | 3306981 A1 | 4/2018 |
| JP | 2018-530184 A | 10/2018 |
| WO | 2019/240770 A1 | 12/2019 |
| WO | 2020/117121 A1 | 6/2020 |
| WO | 2020/122796 A1 | 6/2020 |

OTHER PUBLICATIONS

International Search Report and Written Opinion dated Nov. 4, 2021 corresponding to International Patent Application No. PCT/EP2021/069309.

Qualcomm Incorporated, "Conditional NR PSCell addition/change procedures," 3GPP Draft; R2-1912297, 3GPP TSG-RAN WG2 Meeting #107bis, Chongqing, China, Oct. 14-18, 2019, Oct. 4, 2019, XP051804379.

Media Tek Inc., "Conditional PSCell addition," 3GPP Draft; R2-1906082, 3GPP TSG-RAN WG2 #106, Reno, Nevada, USA, May 13-17, 2019, May 13, 2019, XP051729559.

Huawei, "New WID on further enhancements on Multi-Radio Dual-Connectivity," RP-193249, 3GPP TSG RAN Meeting #86, Sitges, Spain, Dec. 9-12, 2019.

Atanasov et al., "Programmability of Multi-Connectivity in 5G", 26th Conference of Open Innovations Association (FRUCT), Apr. 20-24, 2020, pp. 38-45.

Office action received for corresponding Japanese Patent Application No. 2023-507938, dated Dec. 11, 2023, 3 pages of office action and 2 pages summary of the Office Action available.

"Report on Email Discussion [107b#52][NR MobE] Open Issues Conditional PSCell Addition/Change (CATT)", 3GPP TSG-RAN WG2 Meeting #108, R2-1915962, Agenda: 6.9.4, CATT, Nov. 18-22, 2019, 5 pages.

"3rd Generation Partnership Project; Technical Specification Group Radio Access Network; Evolved Universal Terrestrial Radio Access (E-UTRA) and NR; Multi-connectivity; Overall Description; Stage 2 (Release 18)", 3GPP TS 37.340 V18.3.0, Sep. 2024, pp. 1-141.

"3rd Generation Partnership Project; Technical Specification Group Radio Access Network; NR; NR and NG-RAN Overall Description; Stage 2 (Release 18)", 3GPP TS 38.300 V18.3.0, Sep. 2024, pp. 1-269.

"CPAC procedures from network perspective", 3GPP TSG-RAN WG2 Meeting #117-e, R2-2202702, Qualcomm Incorporated, Agenda Item: 8.2.3.1, Feb. 21-Mar. 3, 2022, 6 pages.

Office action received for corresponding Chinese Patent Application No. 2202180057961.4, dated Apr. 25, 2025, 9 pages of office action and no page of translation available.

* cited by examiner

EARLY MEASUREMENTS FOR PSCELL ADDITION AFTER HANDOVER

FIELD

The following disclosure relates to the field of handover, e.g. conditional handover, or more particularly relates to systems, apparatuses, and methods for performing early measurements for a PSCell addition, e.g. conditional PSCell addition, after a handover, e.g. conditional handover.

BACKGROUND

3GPP Rel-16 specifies a Conditional Handover (CHO) procedure. Rel-17 is supposed to study further improvements to achieve reliable and low-latency handover between nodes supporting Dual Connectivity (DC). Rel-17 MR-DC WI RP-193249 defines one objective relating to the support of conditional Primary SCG Cell (PSCell) change/addition, in particular supporting scenarios which are not addressed in Rel-16 NR mobility WI. Further, it contains aspects of NR Rel-16 MobEnh, which will be contributing to MR-DC Rel-17 WI named above, such as CHO related aspects.

Furthermore, 3GPP Rel-16 contains some enhancements for efficient Multi radio dual connectivity (MR-DC) configuration and improving MR-DC performance, by e.g. early measurement reporting.

For MR-DC deployments, when user equipment (UE) is moving between nodes supporting DC, it is desirable to have direct DC handover or addition of a Secondary Cell Group (SCG) quickly after handover. This may require up-to-date information of all PSCells known to source via neighbor-cell information.

In case of CHO, the handover is triggered at radio condition where target PSCells may not be visible during the configuration of CHO. Hence the PSCell measurements may not be configured at the time of CHO configuration.

SUMMARY OF SOME EXEMPLARY EMBODIMENTS

A problem with the current CHO approach is that SN can be added by target PCell of handover only after a) it configures the UE with measurements for PSCell and b) obtains measurements which may take some time delaying the DC configuration. This delay in setting up the SN may cause loss in throughput and reliability of the radio link.

So, a drawback of CHO is that target node does not know the status of the measurements conducted by the UE. In some cases, the measurement configuration from source node may not include the measurement objects relevant for the target secondary cells. In such cases, when CHO is triggered the target node will need the measurements relevant for its secondary cells to be started along with CHO measurements at source node.

It has been considered that the target node may trigger the measurement report via signaling when needed. Further it has been considered that the source cell may send the UE measurement results to the target cell prior to the CHO, e.g., in the HO request message.

However, this approach has the following problems:
a) The measurements that are forwarded by the source cell may not be relevant for the target PCell as the source cell may not have information (e.g. frequencies) on the PSCell under the control of the target PCell.
b) Further, these measurement results can become easily outdated as the time between CHO preparation and CHO execution can be up to several seconds. Adding a PSCell after the handover using outdated measurements may lead to handover failure.

It is thus, inter alia, an object of embodiments disclosed to achieve a fast set-up DC for a target cell in a CHO context.

According to a first exemplary aspect, a method is disclosed, the method comprising:
obtaining measurement configuration information indicative of a measurement configuration for a measurement on at least one target secondary cell of a mobile communication network,
executing a handover to a target cell, and,
before and/or during executing the handover, starting a measurement on at least one target secondary cell based, at least in part, on the measurement configuration information.

The target secondary cell may be part of a target secondary cell group (SCG) and the measurement on the target secondary cell may be a measurement on a set of frequencies, managed by a SN, including the target secondary cell.

The handover may be a regular handover or a conditional handover.

The target secondary cell may in particular be a candidate secondary cell for the target cell (i.e. PCell).

With the method described above, a target secondary cell measurement, e.g. a candidate PSCell measurement, may be started already before and/or during executing handover (CHO or regular HO) to the target cell. In particular, some early or earlier measurements on the potential target secondary cell frequencies may be started when an apparatus, in particular Internet-of-Things (IoT), or a User Equipment (UE), is still served by the source node, i.e. before and/or during triggering the handover (CHO or regular HO) execution. In this way, it may be achieved that SN addition/Conditional PSCell Addition (CPA) may be executed quicker, in particular to achieve fast DC set-up and configuration on target side.

In particular, it may be beneficial for direct DC handover if the source node does additional measurements on potential PSCell(s) along with measurements for Primary Cell (PCell) mobility. Further, early measurements at source for the potential target PSCell(s) as selected by target may be important for faster DC activation during mobility. Further, when CHO is triggered the target node may also need the measurements relevant for its secondary cells to be started along with CHO measurements at source.

The method may for instance be performed and/or controlled by a mobile device, e.g. an automated an IoT device, and/or a UE. For instance, the method may be performed and/or controlled by using at least one processor of the mobile device.

The mobile communication network may for instance be a cellular network. The mobile communication network may for example be a mobile phone network like a 2G/3G/4G/5G/New Radio (NR) and/or future cellular communication network. The 2G/3G/4G/5G/NR cellular radio communication standards are developed by the 3GPP and presently available under http://www.3gpp.org/.

According to a further exemplary aspect, a computer program is disclosed, the computer program when executed by a processor causing an apparatus, for instance a server, to perform and/or control the actions of the method according to the first exemplary aspect.

The computer program may be stored on computer-readable storage medium, in particular a tangible and/or non-transitory medium. The computer readable storage medium could for example be a disk or a memory or the like.

The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect, an apparatus is disclosed, configured to perform and/or control or comprising respective means for performing and/or controlling the method according to the first exemplary aspect.

The means of the apparatus can be implemented in hardware and/or software. They may comprise for instance at least one processor for executing computer program code for performing the functions, at least one memory storing the program code, or both. Alternatively, they could comprise for instance circuitry that is designed to implement the functions, for instance implemented in a chipset or a chip, like an integrated circuit. In general, the means may comprise for instance one or more processing means or processors.

According to a further exemplary aspect, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise the disclosed components, for instance means, processor, memory, or may further comprise one or more additional components.

Such an apparatus (e.g. a mobile device), as used herein, may for instance be portable (e.g. weigh less than 1, 0.9, 0.8, 0.7, 0.6, 0.5, 0.4, 0.3, 0.2, 0.1 kg, or less), like a mobile phone, personal digital assistance device, computer, laptop computer as a non-limiting examples. The apparatus may for instance comprise or be connectable to a display for displaying information, e.g. a picture or a video that is transferred to the apparatus via the mobile communication network, to name but one non-limiting example. The apparatus may for instance comprise or be connectable to means for outputting sound, e.g. in the form of spoken commands or information.

According to a second exemplary aspect, a method is disclosed, the method comprising:
  receiving, from a target node, target secondary cell information indicative of at least one target secondary cell,
  upon reception of the target secondary cell information, transmitting a measurement configuration information indicative of a measurement configuration for a measurement on at least one target secondary cell based, at least in part, on the target secondary cell information.

The method may in particular comprise receiving, from a target node, target secondary cell information indicative of a target secondary cell group (SCG) comprising the at least one target secondary cell.

The at least one target secondary cell may in particular be a candidate secondary cell for the target cell.

The target secondary cell information may in particular be indicative of measurement related information for a measurement related to at least one target secondary cell.

For example, the target secondary cell information may be indicative of a request to include into a configuration, e.g. source configuration, a measurement configuration information indicative of a measurement configuration for a measurement on at least one target secondary cell.

The transmission of the measurement configuration information is in particular a transmission to an apparatus according to the first aspect, e.g. a UE or IoT device.

With the method disclosed above, measurement configuration information for cell measurement, e.g. candidate PSCell measurement(s), for the target node may be provided to the source node already before and/or during executing CHO to the target node. In this way, early or earlier measurements started when an IoT device/UE is still served by the source node, before and/or during triggering the HO execution (CHO or regular HO), can be performed with configuration relevant for the target node. In this way, it may be achieved that SN addition/CPA may be executed quicker, in particular to achieve fast DC set-up and configuration on target side.

This method may for instance be performed and/or controlled by an apparatus, for instance a radio access node, e.g. a primary node, e.g. an en-gNB or a ng-eNB. Alternatively, this method may be performed and/or controlled by more than one apparatus, for instance the master node (e.g. a eNB, or a ng-eNB) and a secondary node. For instance, the method may be performed and/or controlled by using at least one processor of the radio access node.

According to a further exemplary aspect, a computer program is disclosed, the computer program when executed by a processor causing an apparatus, for instance a server, to perform and/or control the actions of the method according to the second exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect, an apparatus is disclosed, configured to perform and/or control or comprising respective means for performing and/or controlling the method according to the second exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect, an apparatus is disclosed, comprising at least one processor and at least one memory including computer program code, the at least one memory and the computer program code configured to, with the at least one processor, cause an apparatus, for instance the apparatus, at least to perform and/or to control the method according to the second exemplary aspect.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise only the disclosed components, for instance means, processor, memory, or may further comprise one or more additional components.

According to a further exemplary aspect, a system is disclosed, comprising:
at least one apparatus according to the first exemplary aspect as disclosed above, and at least one apparatus according to the second exemplary aspect as disclosed above.

With the aspects described above, it may be possible to enable a fast or faster set-up and configuration of DC in a candidate target NR NodeB (gNB). Further, the target node may do a better decision whether or not to activate the DC, based on the early measurements. Further, the target node may have more accurate knowledge of the measurements needed to configure and activate DC.

In the following, exemplary features and exemplary embodiments of all aspects will be described in further detail.

According to an exemplary embodiment of the first exemplary aspect, the handover is a handover from a source cell of the mobile communication network to the target cell and obtaining the measurement configuration information includes receiving the measurement configuration information from a source node. In this way, e.g., the UE/IoT device may receive already from a source node measurement configuration information for performing an early measurement relevant for the target node before and/or during HO (CHO or regular HO).

According to an exemplary embodiment of the first exemplary aspect, the method further comprises:
obtaining a handover configuration information indicative of a handover configuration for executing a handover to the target node.

According to an exemplary embodiment of the first exemplary aspect, obtaining the measurement configuration information and the handover configuration information includes or comprises receiving a radio resource control (RRC) configuration, the RRC configuration comprising the measurement configuration information and the handover configuration information.

In this way, the source node may transmit and the UE/IoT device may receive the measurement configuration information and the handover configuration information with one message, thereby reducing the number of messages to be exchanged.

According to an exemplary embodiment of the first exemplary aspect, the radio resource control configuration further includes (or comprises) a conditional PSCell addition configuration.

In particular, the RRC configuration may contain CPA configuration information indicative of a CPA configuration.

In such case, the target node may, for example, inform the source node to include or comprise the measurement identifier (ID) for the PSCell in the source configuration with the triggering condition postponed after HO execution (CHO or regular HO). In particular, according to an exemplary embodiment, a PCell HO is triggered first, and, after that, any PSCell Addition execution or CPA may be done, in particular without new signaling from the new source (i.e. the former target) about the CPA configuration (e.g. explicitly). This may e.g. be the case of CPA configuration to set-up for one or more SCG.

According to an exemplary embodiment of the first exemplary aspect, the method further comprises:
after executing the handover to the target cell, obtaining a CPA configuration.

In this case, the CPA configuration may in particular be obtained (e.g. received) from the new source node, i.e. from the former target node. In particular CPA configuration information indicative of a CPA configuration may be received.

According to an exemplary embodiment of the first exemplary aspect, the measurement configuration information is indicative of one or more than one measurement identifiers (IDs), each measurement ID being indicative of a measurement configuration for a measurement on a respective potential target secondary cell.

In this way, the source node may provide one or more measurement IDs, in particular a list of measurement IDs, whose measurement results are relevant for the target node for a decision on SN addition or CPA. In this way, UE/IoT device may in particular start or perform early measurement(s) on one or more than one candidate PSCells for the target node. In particular, the source node may be informed by the target node to include or comprise one or more measurement IDs in a configuration, e.g. source configuration, so that the one or more measurement IDs may, e.g., be forwarded to an UE/IoT device for such early measurement(s).

According to an exemplary embodiment of the first exemplary aspect, the method further comprises:
mapping measurement results of the measurement identifiers, to target measurement identifiers in a target measurement configuration.

According to an exemplary embodiment of the first exemplary aspect,
the method further comprises:
after execution of the handover, transmitting measurement result information indicative of a result of the measurement.

The transmission of measurement result information may in particular be a transmission to the target node, which after execution of the handover is or represents the new source node.

According to an exemplary embodiment of the first exemplary aspect, the method further comprises:
after execution of the handover, transmitting a handover complete message indicative of the completion of the handover, wherein the handover complete message includes or comprises the measurement result information.

In particular, the UE/IoT device may provide the measurement results as soon as possible to the target node after HO (CHO or regular HO). In this way, the network may be enabled to configure Dual Connectivity Carrier Aggregation (DC/CA) after HO as fast as possible. To this end, UE/IoT device may in particular provide measurement results already in HO complete message According to an exemplary embodiment of the first exemplary aspect, the method further comprises:
after execution of the handover, activation of dual connectivity based, at least in part, on the CPA configuration.

In particular, execution of the handover, e.g. PCell HO, may be performed before and/or during execution of any addition of a secondary target cell, e.g. PSCell Addition. In other words, according to an exemplary embodiment, PCell HO may be triggered first and then any PSCell Addition execution or CPA may be done, in particular without new signaling from new source about CPA configuration (e.g. explicitly).

Addition of a secondary target cell, e.g. PSCell Addition, may be a conditional addition of a secondary target cell, e.g. conditional PSCell Addition.

According to an exemplary embodiment of the first exemplary aspect, the apparatus is or is part of a mobile device and/or an Internet-of-Things, IoT device.

According to an exemplary embodiment of the second exemplary aspect, the target secondary cell information and/or the measurement configuration information include one or more than one measurement identifiers being indicative of a respective target secondary cell.

For instance, such measurement identifier(s) may be assigned to a particular PSCell and/or a PSCell characteristic such as, e.g., frequency or frequency band. In this way, a source node may be provided by a target node with target secondary cell information which may allow early measurement(s) relevant for the target node before and/or during a handover to the target node.

In particular, the target secondary cell information and/or the measurement configuration information may include or comprise a list of more than one measurement identifiers indicative of a respective target secondary cell. In this way, e.g., measurements for several candidate target secondary cells may be started before and/or during handover.

For example, the measurement configuration may include one or more of the following: a measurement ID, a measurement object ID, a measurement report ID.

According to an exemplary embodiment of the second exemplary aspect, receiving the target second cell information from the target node may be receiving the target second cell information without CPA configuration. In particular, measurement related configuration(s) may be received from the target node without the CPA configuration. In such case, the CPA configuration may be sent to the UE/IoT device by the new source node (i.e. by the former target node) after the PCell HO has been triggered.

In particular, in such case, the source node may be informed by the source node to include or comprise the measurement identifier(s) in the source configuration. PCell HO may then be triggered first, and afterwards the new source (e.g. the former target node) may send the CPA configuration, which may be applied right after. Further, in such case, the UE/IoT device may perform or at least start the measurement(s) based on the measurement identifier(s) before and/or during CHO execution. UE/IoT device may then provide the measurement results to the target node for example as soon as possible after HO (CHO or regular HO). In this way, the network may configure DC/CA after HO as fast as possible. For example, the UE/IoT device may provide the measurement results already in the HO complete message.

The source node may provide to the UE/IoT device a list of one or more measurement IDs whose measurement results are relevant for target node for decision on secondary node addition or CPA.

According to an exemplary embodiment of the second exemplary aspect, the target secondary cell information is indicative of a request to replicate in the source configuration one or more than one measurement identifiers being indicative of a measurement configuration for a measurement on a respective target secondary cell, e.g. a target SCG including a target secondary cell.

In particular, the request may be a request to replicate in the source configuration the one or more measurement identifiers, e.g. {A, B, C}, with new or, respectively, different measurement identifiers, e.g. {A1, B1, C1}. In this way, the source node may be able to distinguish between the measurement identifiers, e.g. {A1, B1, C1}, from the target node and measurement identifiers from the source node.

Further, the method may comprise: adding to the measurement configuration information to be transmitted the new or, respectively, different measurement identifier(s). Accordingly, the measurement configuration information may comprise the new or, respectively, different measurement identifier(s). The measurement configuration information may be transmitted, in particular, as part of an RRC configuration, e.g. RRC-reconfiguration.

According to an exemplary embodiment of the second exemplary aspect, the method further comprises:

mapping the measurement identifiers, to source measurement identifiers in a source measurement configuration.

The measurement identifiers are in particular the new or different measurement identifiers added to the measurement configuration information of a transmitted RRC (re)configuration containing a CHO configuration. The target measurement configuration may in particular be a target measurement configuration linked to conditional PSCell addition.

The measurement ID(s) that is/are linked to conditional PSCell addition may result in triggering a measurement report to the target master radio access node (MN) for preparing the SN as part of CPA procedure after the handover.

According to an exemplary embodiment of the second exemplary aspect, the method further comprises receiving, after transmitting the measurement configuration information, a handover success information indicative of a successful handover to the target node.

The measurement configuration information may in particular be transmitted to the UE/IoT device before and/or during the handover to the target node, in particular before receiving the handover success information, so that the UE/IoT device may start early measuring.

According to an exemplary embodiment of the second exemplary aspect, receiving the request information and/or transmitting the source configuration is performed via a source master node of the mobile communication network.

The features and example embodiments described above may equally pertain to the different aspects.

It is to be understood that the embodiments and aspects in this section is merely by way of examples and non-limiting.

Other features will become apparent from the following detailed description considered in conjunction with the accompanying drawings. It is to be understood, however, that the drawings are designed solely for purposes of illustration, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding of the exemplary embodiments and shall be understood to complement and be read together with the description as provided in the above summary section of this specification.

Figure 1:
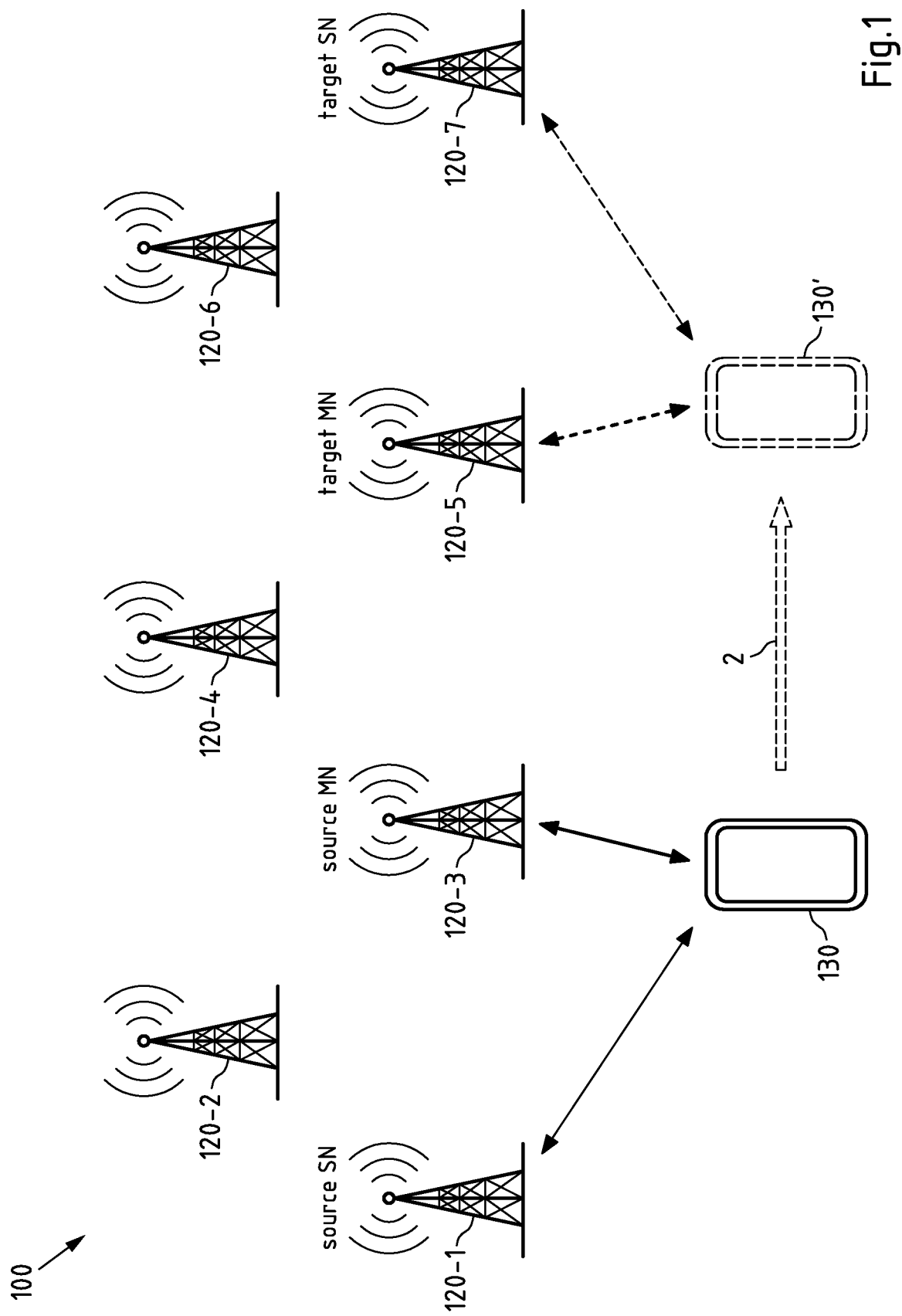
FIG. 1 a schematic block diagram of a system according to an exemplary aspect.

FIG. 1 is an example of a schematic high-level block diagram of a system according to an exemplary aspect. The system 100 comprises a mobile device 130, which may be a UE/IoT device.

The system 100 further comprises a plurality of gNBs 120-1 to 120-7 which signals are observable by the mobile device 130. The gNBs 120-1 to 120-7 are part of mobile communication network.

At first, mobile device 130 is served by gNB 120-3 as master PCell (thick solid double arrow) and via DC by gNB 120-1 as secondary PSCell (thin solid double arrow). The DC may, e.g., provide increased reliability, lower latency and/or better bandwidth.

Dual connectivity is used as an example. The embodiments and aspects could be applied also for example in multi-connectivity type of environment as well.

When the mobile device 130 moves to a neighboring cell (illustrated by dashed arrow 2 and the dashed contour 130'), a handover, e.g. conditional or regular HO, may be executed from PCell of source master node gNB 120-3 to PCell of target master node gNB 120-5.

Figure 2A:
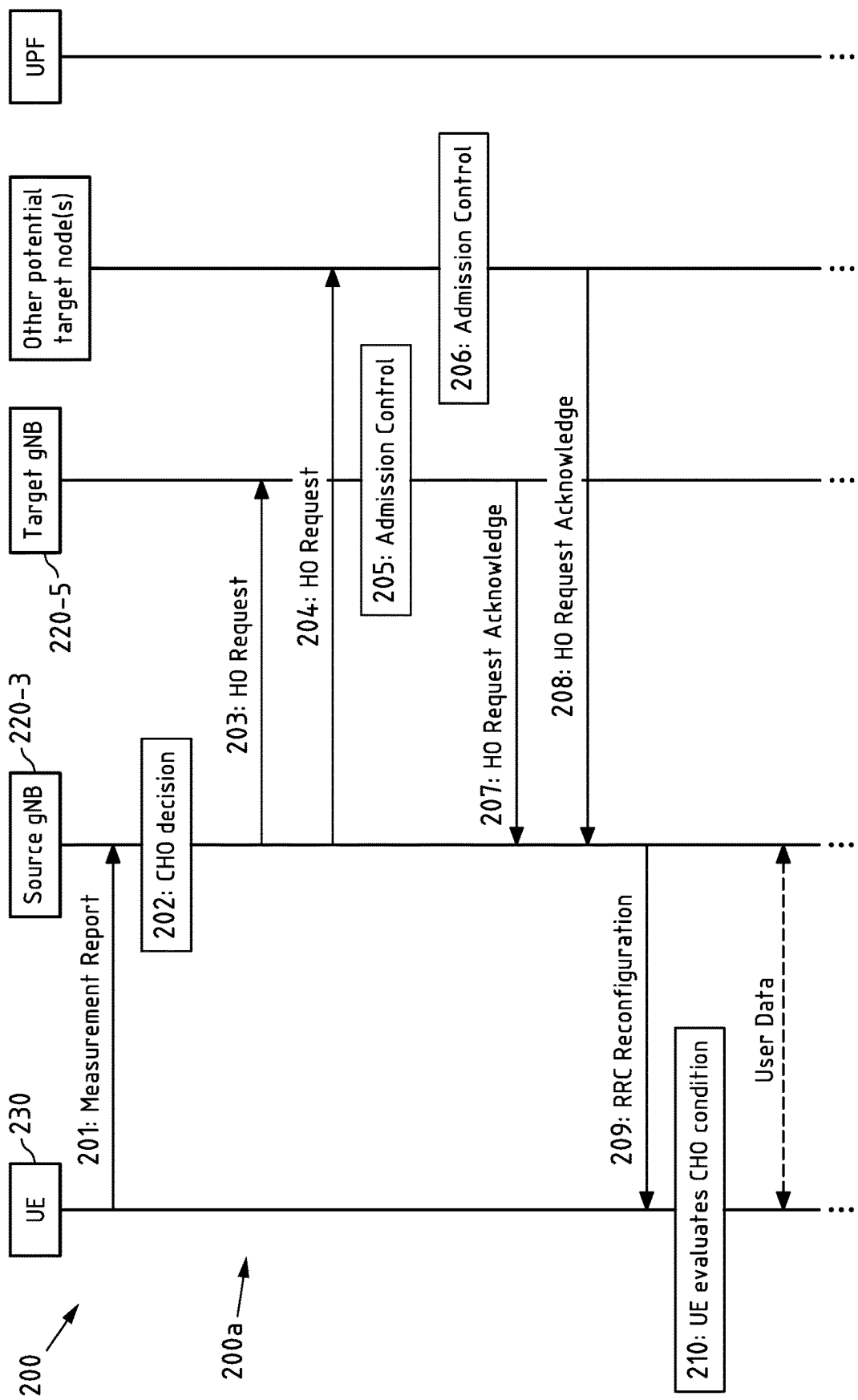
FIG. 2a-b a signaling chart showing an example embodiment of a method for conditional handover between a source and a target node.
Figure 2B:
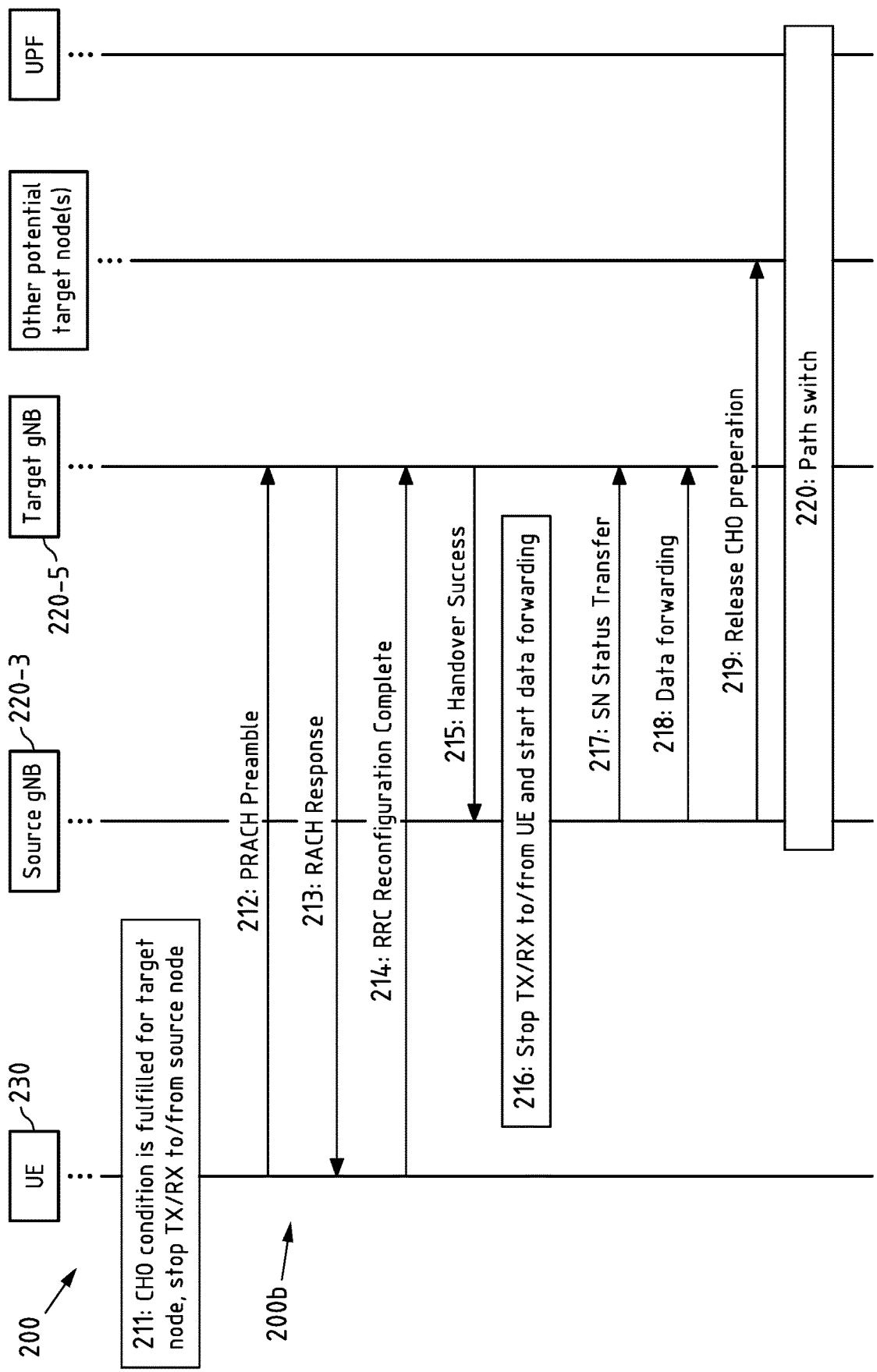

FIG. 2a-b is a signaling chart 200 showing an example embodiment of how a standard process for conditional handover of a UE 230 between a source gNB 220-3 and a target gNB 220-5, may be performed. FIG. 2a shows the upper (first) part 200a and FIG. 2b shows the lower (second) part 200b of chart 200. For clarity purposes, the labels for the respective entities "UE", "source gNB" etc. are repeated in FIG. 2b.

For example, UE 130 may be configured as UE 230, source gNB 120-3 may be configured as gNB 220-3, and/or target gNB 120-5 may be configured as gNB 220-5.

The process may comprise some or all of the following steps:

Step 201: UE transmits a measurement report to the source gNB.

Step 202: The source gNB decides on whether or not to initiate a CHO based, at least in part, on the measurement report.

Step 203: The source gNB sends an HO request to the target gNB.

Step 204: The source gNB may also send HO requests to one or more further potential target nodes.

Step 205: The target gNB executes admission control for the requested HO.

Step 206: The further potential target(s) gNB may also execute admission control for the requested HO.

Step 207: For acknowledging the HO request, the target gNB transmits a HO Request Acknowledge to the source gNB.

Step 208: Also the further potential target(s) gNB may transmit respective HO Request Acknowledge(s) to the source gNB.

Step 209: The source gNB transmits to the UE an RRC reconfiguration, the RRC reconfiguration including a CHO configuration comprising at least one CHO condition for executing the HO to the target cell of the target node.

Step 210 The UE evaluates the CHO condition from the RRC reconfiguration and continues exchanging user data with the source gNB.

Step 211: Once the CHO condition is fulfilled for (one of) the target cell, the UE stops TX/RX to/from the source node.

Step 212: UE transmits a physical-layer Random Access Channel (PRACH) Preamble to the target gNB.

Step 213: In response, the target gNB transmits a Random Access Channel (RACH) Response to the UE.

Step 214: UI transmits to the target gNB a RRC Reconfiguration Complete information indicating that the RRC reconfiguration is completed.

Step 215: The target gNB then transmits Handover Success information to the source gNB.

Step 216: Upon reception of the Handover Success information, the source gNB stops TX/RX to/from the UE and may start data forwarding to the target gNB.

Step 217: The source gNB transmits to the target gNB a SN Status Transfer information.

Step 218: The source gNB may further perform data forwarding to the target gNB.

Step 219: The source gNB may further release other potential target node(s) by transmitting a Release CHO preparation information.

Step 220: Communication path switches.

FIG. 2a-b illustrates a CHO procedure which supports preparation of multiple target cells. In case of CHO, the HO is conditioned to evaluation configuration condition fulfilment, but the HO command may be or is most likely received by the UE. Therefore, the CHO targets to improve the HO robustness. With CHO, UE continues TX/RX with source cell until the CHO execution condition is fulfilled for one of the prepared target nodes. Late data forwarding (step 218) may be carried out, which may be triggered when source gNB receives "HO Success" message from the target node (step 215).

The target node may provide the conditional configuration as part of the HO-REQ-ACK.

A first possible configuration (Configuration-1) may include: Master Cell Group configuration, measurement Identifier of source configuration for, for example, A3. Configuration-1 may include, for example, CHO-related measurements only, e.g., if it does not have the CPA configuration, yet.

A second possible configuration (Configuration-2) may include: Configuration-1 plus Second Cell Group configuration. For example, Configuration-2 may in particular include measurement identifier of target configuration for A4 (CPA after CHO).

The measurement identifier of the source node may also be kept after CHO. In this way, the pending measurement status is allowed to be continued in the target node, when the target measurement starts.

Figure 3:
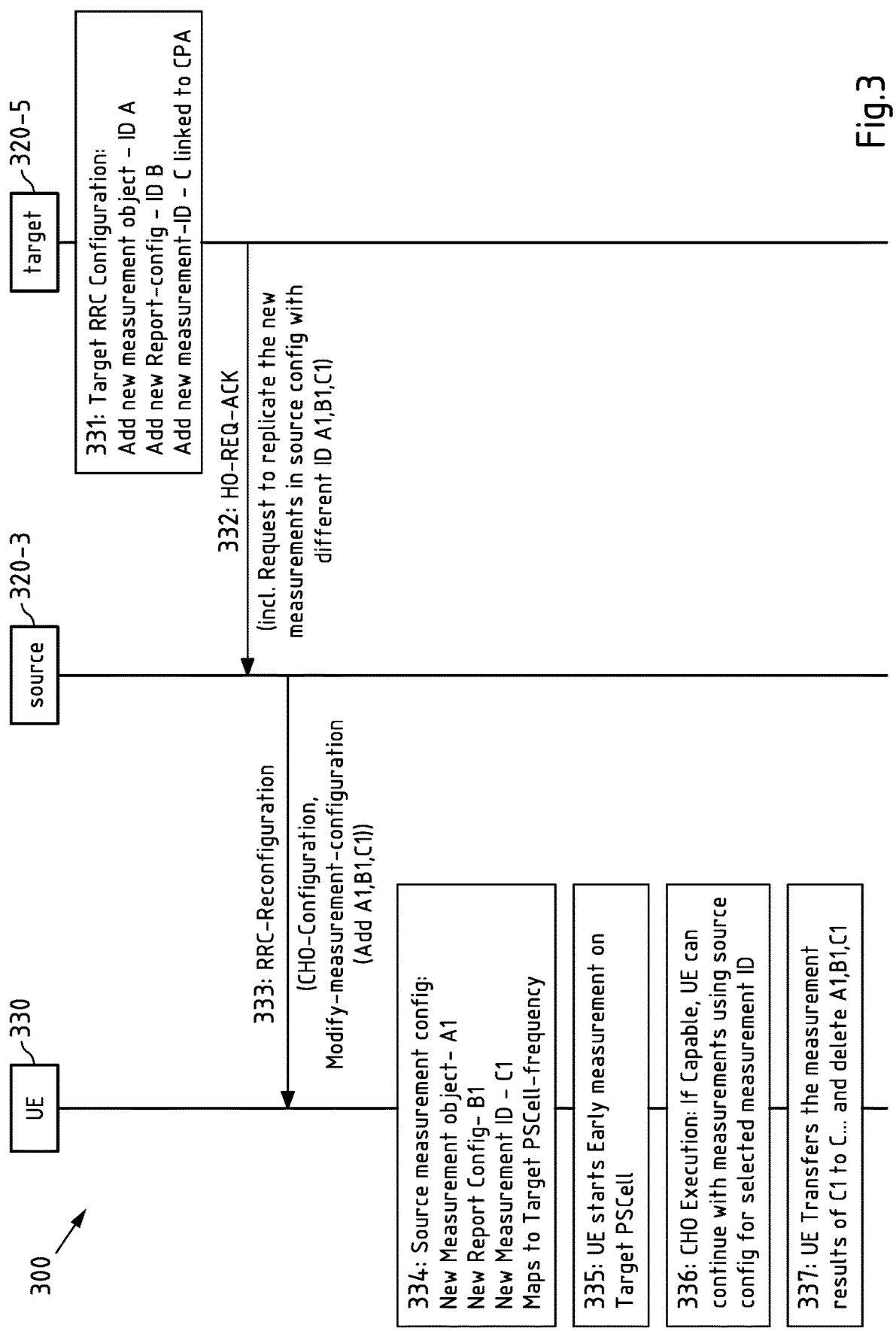
FIG. 3 a signaling chart showing an example embodiment of a method according to the first exemplary aspect and further showing an example embodiment of a method according to the second exemplary aspect.

FIG. 3 is a signaling chart 300 showing an example of how an exemplary process for conditional handover of a UE 330 between a source gNB 320-3 and a target gNB 320-5, may be performed.

For example, UE 130 may be configured as UE 330, source gNB 120-3 may be configured as gNB 320-3, and/or target gNB 120-5 may be configured as gNB 320-5.

FIG. 3 further shows an example embodiment of a method according to the first exemplary aspect and further shows an example embodiment of a method according to the second exemplary aspect. Further, UE 330 may be an example embodiment for an apparatus according to the first exemplary aspect. Further, source gNB 320-3 may be an example embodiment for an apparatus according to the second exemplary aspect.

The process in FIG. 3 may for example be carried out after an HO Request of the source node, e.g. source node 320-3, to a target node, e.g. target node 320-5, (as in step 203).

The process may comprise some or all of the following steps:

Step 331: The target node prepares target RRC Configuration. In particular, the target node adds thereto measurement configuration information indicative of a measurement configuration for a measurement for at least one target secondary cell, e.g. a target secondary cell group comprising at least one target secondary cell. According to an option 1, this measurement configuration information may in particular include at least one of a new measurement object identifier (A), a new report config identifier (B) and a new measurement identifier (C), which may be linked to the CPA.

Step 332: The target node transmits to the source node an HO Request Acknowledgment, e.g. HO-REQ-ACK, therewith acknowledging a prior HO Request of the source node. The HO-REQ-ACK here further includes a request to replicate the new measurements, e.g. {A, B, C}, in the source config with different IDs, e.g. {A1, B1, C1}

Step 333: When the source node transmits to the UE 330 the RRC reconfiguration including the CHO configuration (as in step 209), the source node adds information for adding the new measurements (e.g. by adding measurement identifiers {A1, B1, C1}). The RRC reconfiguration may or may not include the CPA configuration.

Step 334: Upon reception of the RRC reconfiguration, the UE processes the source measurement configuration, in particular at least in part based on the modify-measurement-configuration, and creates at least one of a new measurement object (e.g. A1), a new report config (e.g. B1) and a new measurement identifier (e.g. C1).

Step 335: With the measurement config from step 334, the UE 330 can then start an early measurement on the target PScell(s).

Step 336: After step 335, the CHO is executed when the CHO condition is fulfilled. If capable, the UE 330 may continue with measurements using the source configuration for the selected measurement ID.

Step 337: UE 330 transfers the new measurement results (C1) to the original measurement (C) and then deletes the new measurements (A1, B1, C1).

In the example shown in FIG. 3, the target node 320-5 creates at least one of a new measurement identifier, e.g. new measurement object—ID A, new report-config—ID B or new measurement-ID—ID C, for source configuration. In this example, the target node 320-5 creates new measurement-ID for configuration-2 for the target UE context. Target node 320-5 informs the source node 320-3 to include this measurement-ID in the source configuration with the triggering condition postponed after handover execution.

To that purpose, target and source node, in the example in FIG. 3, negotiate a mapping of measurement IDs {A, B, C} at target to IDs {A1, B1, C1} at source. This may be referred to as loaning of measurements based on measurement ID mapping. If there is no CPA attached to this in target configuration, the target node can for example propose the new measurements (in the given example denoted as {A, B, C}) to the source without creating one in the target configuration. Such a variant can, e.g. take place, if early measurements are desired for the target node and if it is sufficient to do CPA later based on the measurement results.

The measurement identifiers, e.g. {A, B, C}, are linked to the CPA. In that way, measurements relevant for the target can be started before and/or during CHO.

With the example described above, the measurements for the measurement-ID at source may seamlessly continue also during and/or after CHO. And if the triggering condition is met after CHO, the CPA configuration may be executed.

It can be advantageous, if UE provides the measurement results as soon as possible to the target node after HO, e.g. CHO or regular HO, in order to allow the network (NW) to configure DC/CA/multi-connectivity after HO as fast as possible. For example, UE may provide the measurement results already in the HO complete message or in for example reconfiguration complete message, here denoted as Msg3. Reporting the early measurements in Msg3 can be beneficial for a scenario in which the target node may decide to continue or not with CPA based on the interim measurement results reported in for example Msg3. Msg3 is an example.

The example shown in FIG. 3 encompasses an exemplary embodiment of the method according to the first exemplary aspect. Further, the UE 330 may be or may be part of an apparatus according to the first aspect.

UE 330, which may be a mobile device such as a cellular phone, comprises at least one processor and at least one memory including computer program code. The at least one memory and the computer program code are configured to, with the at least one processor, cause the UE to at least perform the following:

obtaining, in step 333, an RRC reconfiguration from the source node 320-3, comprising, for example, at least one of
i) measurement configuration information indicative of a measurement configuration, e.g. modify-measurement-configuration {A1, B1, C1}, for a measurement on at least one target secondary cell, e.g. on a target secondary cell group (SCG) including at least one target secondary cell, and
ii) handover configuration information, e.g. CHO-Configuration, indicative of a handover configuration for executing a handover to the target cell of target node 320-5, executing, in step 336, a handover from the source cell of source node 320-3 to the target cell of target node 320-5 based, at least in part, on the handover configuration information and, before and/or during executing the handover, starting, in step 335, a measurement on at least one target secondary cell, e.g. on a target secondary cell group comprising at least one target secondary cell, based, at least in part, on the measurement configuration information, e.g. by creating new measurement object/measurement report/measurement identifier and mapping in step 334 to a given target PSCell frequency.

The example shown in FIG. 3 further encompasses an exemplary embodiment of the method according to the second exemplary aspect. In particular, in this example, the source node 320-3 may be or may be part of an apparatus according to the second aspect.

The target node comprises at least one processor and at least one memory including computer program code. The at least one memory and the computer program code are configured to, with the at least one processor, cause the target node to at least perform the following:

receiving, in step 332, from the target node 320-5, target secondary cell information, e.g. HO-REQ-ACK, indicative of at least one target secondary cell, e.g. a target secondary cell group comprising at least one target secondary cell, upon reception of the target secondary cell information, e.g. HO-REQ-ACK, transmitting, in step 333, an RRC configuration, e.g. RRC-reconfiguration, to the UE 330, comprising, for example, at least one of i) measurement configuration information indicative of a measurement configuration, e.g. Modify-measurement-configuration, for a measurement on at least one target secondary cell, e.g. a target secondary cell or cell group assigned to {A1, B1, C1}, based, at least in part, on the target secondary cell information, e.g. HO-REQ-ACK, and ii) handover configuration information indicative of a handover configuration, e.g. CHO-Configuration, for executing a handover to the target cell of target node 320-5.

In the example of FIG. 3, the target secondary cell information is indicative of a request to replicate the new measurement(s), e.g. {A, B, C}, in the source config with different measurement identifier(s), e.g. {A1, B1, C1}. The source 320-2 can then, based at least in part on this target secondary cell information, configure the UE to objects for {A1, B1, C1} for the early measurement(s) by transmitting, e.g., Modify-measurement-configuration.

The request information (e.g. HO-REQ-ACK) may include or comprise a list of measurement identifiers indicative of measurement configurations for measurements on respective target secondary cells or target secondary cell groups of the target node. Furthermore, the measurement configuration information of the source configuration may include or comprise an according list of measurement identifiers. In this way, the source can trigger the UE to perform measurements on several candidate target PSCells relevant for the target node.

Figure 4A:
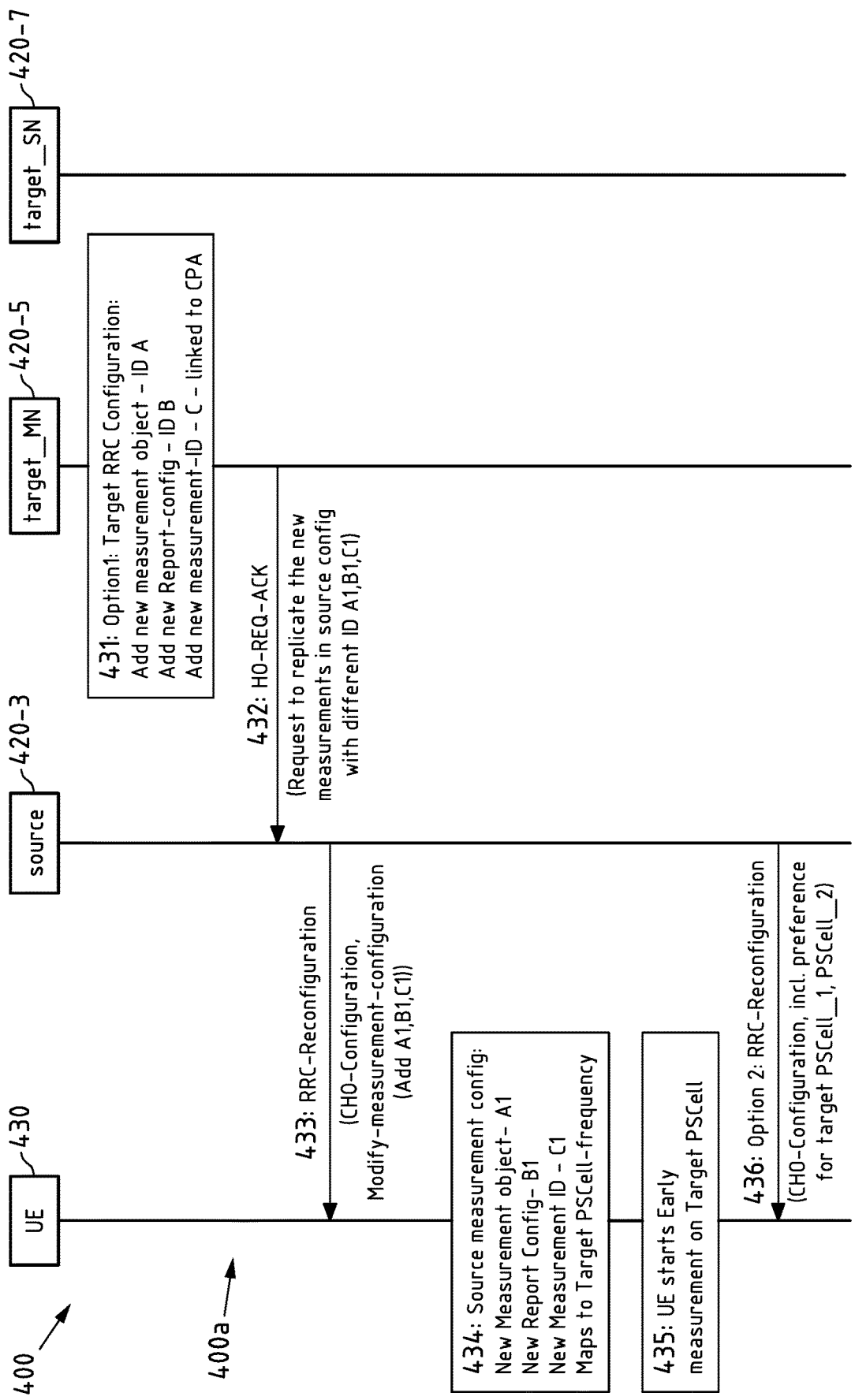
FIG. 4a-b a signaling chart showing a further example embodiment of a method according to the first exemplary aspect and further showing a further example embodiment of a method according to the second exemplary aspect.
Figure 4B:
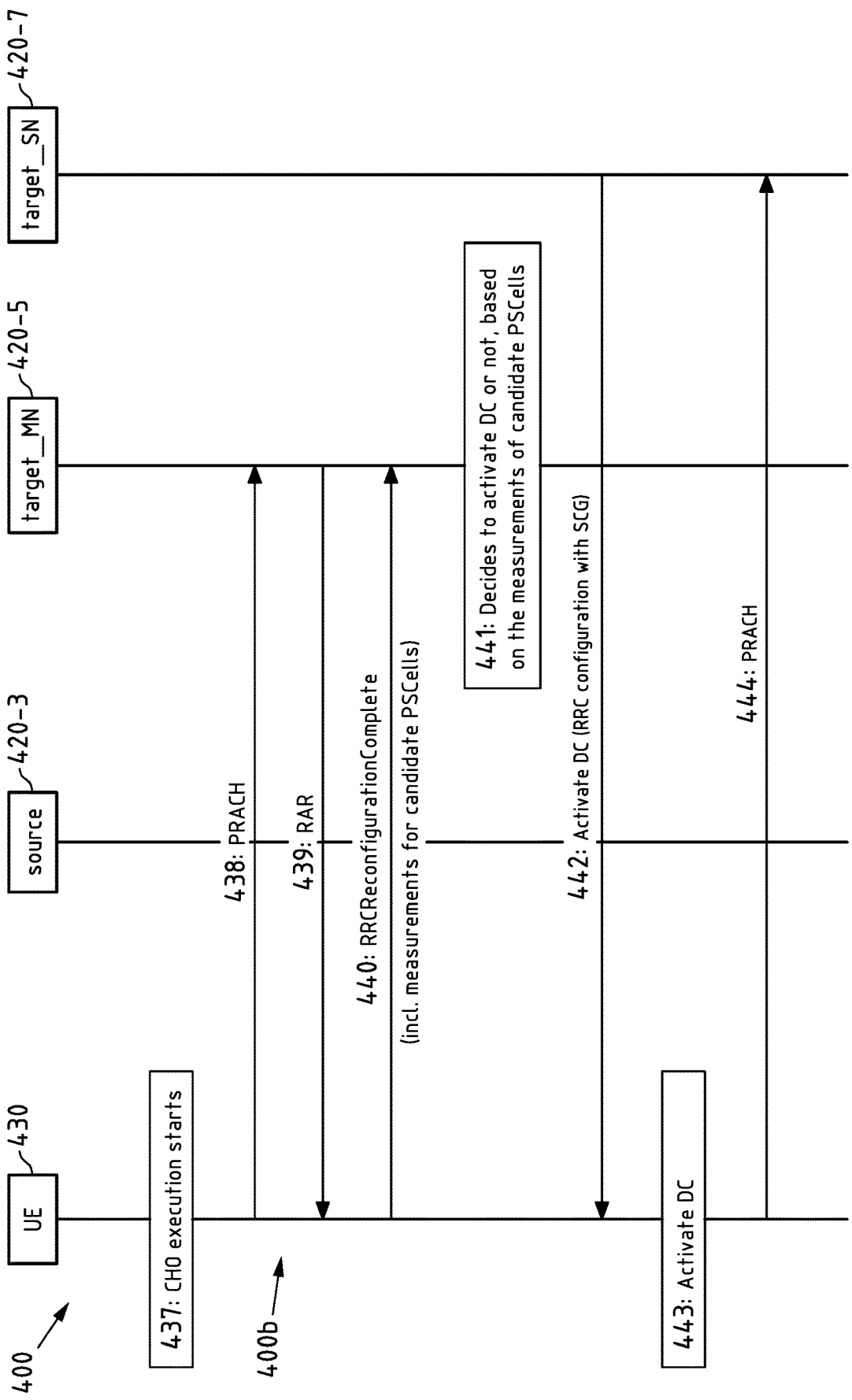

FIG. 4*a-b* is a signaling chart 400 showing a further example of how an exemplary process for conditional handover of a UE 430 between a source gNB 420-3 and a target gNB 420-5, may be performed. FIG. 4*a* shows the upper (first) part 400*a* and FIG. 4*b* shows the lower (second) part 400*b* of chart 400. For clarity purposes, the labels for the respective entities "UE", "source" etc. are repeated in FIG. 4*b*.

For example, UE 130 may be configured as UE 430, source gNB 120-3 may be configured as gNB 420-3, and/or target gNB 120-5 may be configured as gNB 420-5.

FIG. 4*a-b* also shows a further example embodiment of a method according the first exemplary aspect and further shows a further example embodiment of a method according to the second exemplary aspect. Further, UE 430 may be a further example embodiment for an apparatus according to the first exemplary aspect. Further, source gNB 420-3 may be a further example embodiment for an apparatus according to the second exemplary aspect.

The process in FIG. 4*a-b* may comprise some or all of the following steps:

Step 431: This step corresponds to step 331 from FIG. 3.

Step 432: This step corresponds to step 332 from FIG. 3.

Step 433: This step corresponds to step 333 from FIG. 3. In this example embodiment, the RRC reconfiguration does not include the CPA configuration.

Step 434: This step corresponds to step 334 from FIG. 3.

Step 435: This step corresponds to step 335 from FIG. 3.

Step 436: In this step, the source node 430-3 may transmit to the UE an RRC reconfiguration including CHO-configuration and a preference for target PSCells, e.g. PSCell_1 and PSCell_2.

Step 437: This step corresponds to step 336 from FIG. 3.

Step 438: This step corresponds to step 212 from FIG. 2*a-b*.

Step 439: The target node can transmit a Random Access response (RAR) in reply to the PRACH (see also step 213 from FIG. 2*a-b*).

Step 440: UE 430 then transmits RRCReconfiguration-Complete to the target node 420-5 (as in step 214 from FIG. 2*a-b*). In this exemplary embodiment, when making use of option 2, the RRCReconfigurationComplete includes the measurement results for the candidate target PSCells.

Step 441: The target node 420-5 decides to activate DC or not based, at least in part, on the measurement results of candidate target PSCells received in step 440.

Step 442: If the target node 420-5 has decided to activate DC in step 441, the target node 420-5 may then transmit Activate DC command/configuration (including RRC configuration with SCG) to the UE 430. In this way, the target Pcell can add DC configuration by sending to UE an RRC reconfiguration with the secondary cell group configuration.

Step 443: The UE 430 activates DC.

Step 444: The UE 430 transmits PRACH to the selected target secondary node 420-7 (target PSCell).

Steps corresponding to steps 543 and 544 as described below may follow.

FIG. 4*a-b* illustrates an example in which the reporting of the measurements is included in the HO complete message, e.g. RRCReconfigurationComplete.

If the measurement results are included or comprised in HO complete message, e.g. RRCRecofigurationComplete, one or more of the following may be performed and/or controlled, for example:

The source node may configure the measurement ID for event-based reporting on the measurement object of potential target PSCell-frequencies. There may be multiple such measurement identifiers for different PSCell-frequencies of the target node.

As part of HO preparation, the target node may select sub-set of the measurement ID which it needs in for example Msg3 because target may consider these measurement-ID for DC or Carrier Aggregation (CA) setup In one example, target node can provide 'preferred measurement-ID' for early reporting in HO-REQ-ACK.

Figure 5A:
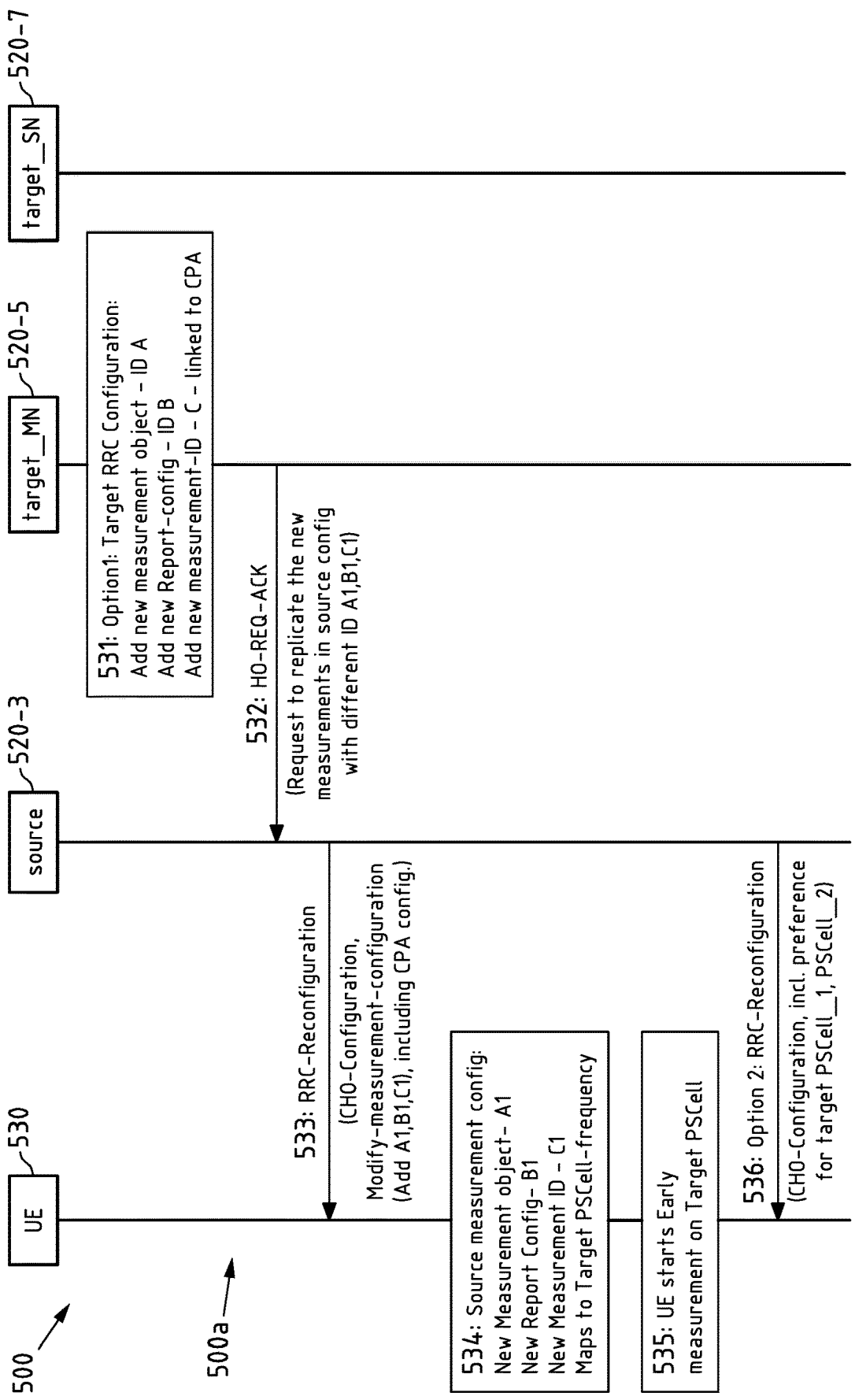
FIG. 5a-b a signaling chart showing a further example embodiment of a method according to the first exemplary aspect and further showing a further example embodiment of a method according to the second exemplary aspect.
Figure 5B:
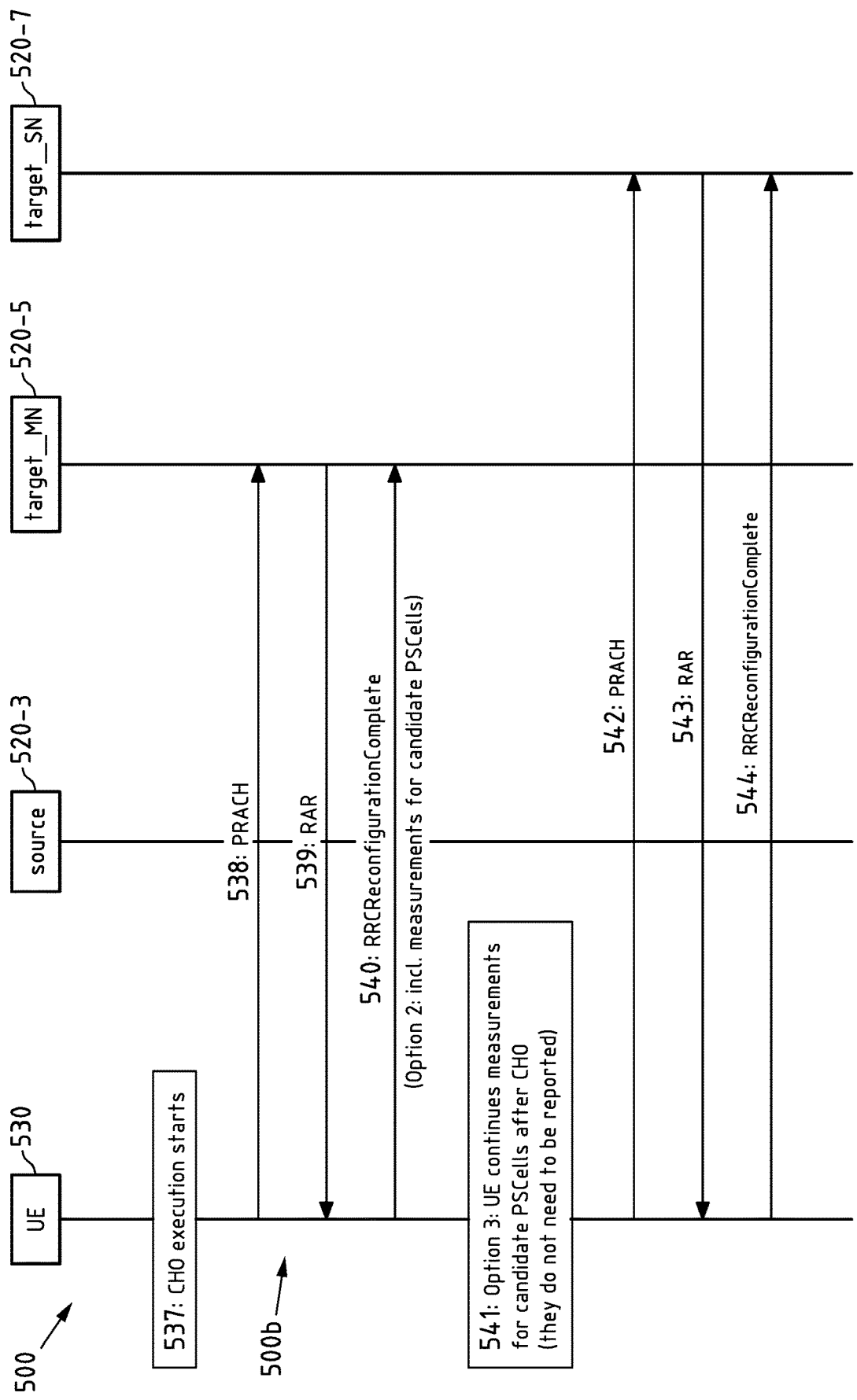

In another example, source node can include 'preferred measurement-ID' for early reporting instead of all the results of PSCells (see also FIG. 5a-b).

During CHO execution, available mapped measurements may be transferred to target node 420-5. Afterwards, DC configuration may be sent by the new source, i.e. the former target node 420-5, based on the measurements.

The example shown in FIG. 4a-b encompasses an exemplary embodiment of the method according to the first exemplary aspect. In particular, in this example, UE 430 may be an apparatus according to the first aspect.

UE 430, which may be a mobile device such as a cellular phone, comprises at least one processor and at least one memory including computer program code. The at least one memory and the computer program code are configured to, with the at least one processor, cause the UE to at least perform the following:

obtaining, in step 433, an RRC reconfiguration from the source node 420-3, comprising, for example, at least one of
  i) measurement configuration information indicative of a measurement configuration, e.g. modify-measurement-configuration {A1, B1, C1}, for a measurement on at least one target secondary cell, e.g. on a target secondary cell group (SCG) including at least one target secondary cell, and
  ii) handover configuration information, e.g. CHO-Configuration, indicative of a handover configuration for executing a handover to the target cell of target node 420-5, executing, in step 437, a handover from the source cell of source node 420-3 to the target cell of target node 420-5 based, at least in part, on the handover configuration information and, before and/or during executing the handover, starting, in step 435, a measurement on at least one target secondary cell, e.g. on a target secondary cell group comprising at least one target secondary cell, based, at least in part, on the measurement configuration information, e.g. by creating new measurement object/measurement report/measurement identifier and mapping in step 434 to a given target PSCell frequency.

The example shown in FIG. 4a-b further encompasses an exemplary embodiment of the method according to the second exemplary aspect on. In particular, in this example, the source node 420-3 may be or may be part of an apparatus according to the second aspect.

The source node 420-3 comprises at least one processor and at least one memory including computer program code. The at least one memory and the computer program code are configured to, with the at least one processor, cause the source node to at least perform the following:

receiving, in step 432, from the target node 420-5, target secondary cell information, e.g. HO-REQ-ACK, indicative of at least one target secondary cell, e.g. a target secondary cell group comprising at least one target secondary cell, upon reception of the target secondary cell information, e.g. HO-REQ-ACK, transmitting, in step 433, an RRC configuration, e.g. RRC-reconfiguration, to UE 430, comprising, for example, at least one of
  i) measurement configuration information indicative of a measurement configuration, e.g. Modify-measurement-configuration, for a measurement on at least one target secondary cell, e.g. a target secondary cell or cell group assigned to {A1, B1, C1}, based, at least in part, on the target secondary cell information, e.g. HO-REQ-ACK, and
  ii) handover configuration information indicative of a handover configuration, e.g. CHO-Configuration, for executing a handover to the target cell of target node 420-5.

FIG. 5a-b is a signaling chart 500 showing a further example of how an exemplary process for conditional handover of a UE 530 between a source gNB 520-3 and a target gNB 520-5, may be performed. FIG. 5a shows the upper (first) part 500a and FIG. 5b shows the lower (second) part 500b of chart 500. For clarity purposes, the labels for the respective entities "UE", "source" etc. are repeated in FIG. 5b.

For example, UE 130 may be configured as UE 530, source gNB 120-3 may be configured as gNB 520-3, and/or target gNB 120-5 may be configured as gNB 520-5.

FIG. 5a-b also shows a further example embodiment of a method according to the first exemplary aspect and further shows a further example embodiment of a method according to the second exemplary aspect. Further, UE 530 may be a further example embodiment for an apparatus according to the first exemplary aspect. Further, source gNB 520-3 may be a further example embodiment for an apparatus according to the second exemplary aspect.

The process in FIG. 5a-b has the following steps:

Step 531: This step corresponds to step 431 from FIG. 4a-b.

Step 532: This step corresponds to step 432 from FIG. 4a-b.

Step 533: This step corresponds to step 333 from FIG. 3. Unlike step 433 from FIG. 4a-b, the RRC reconfiguration in this exemplary embodiment includes the CPA configuration.

Step 534: This step corresponds to step 434 from FIG. 4a-b.

Step 535: This step corresponds to step 435 from FIG. 4a-b.

Step 536: This step corresponds to step 436 from FIG. 4a-b.

Step 537: This step corresponds to step 437 from FIG. 4a-b.

Step 538: This step corresponds to step 438 from FIG. 4a-b.

Step 539: This step corresponds to step 439 from FIG. 4a-b.

Step 540: This step corresponds to step 440 from FIG. 4a-b. In the case of option 2, RRCReconfigurationComplete may include measurement results for candidate PSCells.

Step 541: According to option 3, UE 530 may continue the measurements for candidate PSCells during and/or after the CHO. UE 530 need not report the measurement results to the target node 520-5. As the UE in this example received the CPA configuration in step 533, the UE may continue the measurements for candidate PSCells during and/or after the CHO and perform CPA when the CPA condition is met.

Step 542: This step corresponds to step 444 from FIG. 4a-b.

Step 543: The target secondary node 520-7 (PSCell) responds to the PRACH by transmitting a RAR to the UE 530.

Step 544: The UE 530 transmits RRCReconfiguration-Complete to the target secondary node 520-7.

In an example, measurement results of source are continued further in the target, after handover, if it is linked to conditional PSCell addition. For example, in that case, the reporting of measurements in handover complete is not needed anymore.

The example shown in FIG. 5a-b encompasses an exemplary embodiment of the method according to the first exemplary aspect. In particular, in this example, UE 530 may be an apparatus according to the first aspect.

UE 530, which may be a mobile device such as a cellular phone, comprises at least one processor and at least one memory including computer program code. The at least one memory and the computer program code are configured to, with the at least one processor, cause the UE to at least perform the following:

obtaining, in step 533, an RRC reconfiguration from the source node 520-3, comprising, for example, at least one of
 i) measurement configuration information indicative of a measurement configuration, e.g. modify-measurement-configuration {A1, B1, C1}, for a measurement on at least one target secondary cell, e.g. on a target secondary cell group (SCG) including at least one target secondary cell, and
 ii) handover configuration information, e.g. CHO-Configuration, indicative of a handover configuration for executing a handover to the target node 520-5,
 iii) CPA configuration information indicative of a CPA configuration executing, in step 537, a handover from the source cell of source node 520-3 to the target cell of target node 520-5 based, at least in part, on the handover configuration information and, before and/or during executing the handover, starting, in step 535, a measurement on at least one target secondary cell, e.g. on a target secondary cell group comprising at least one target secondary cell, based, at least in part, on the measurement configuration information, e.g. by creating new measurement object/measurement report/measurement identifier and mapping in step 534 to a given target PSCell frequency.

The example shown in FIG. 5a-b further encompasses an exemplary embodiment of the method according to the second exemplary aspect. In particular, in this example, the source node 520-3 may be or may be part of an apparatus according to the second aspect.

The source node 520-3 comprises at least one processor and at least one memory including computer program code. The at least one memory and the computer program code are configured to, with the at least one processor, cause the source node to at least perform the following:

receiving, in step 532, from the target node, target secondary cell information, e.g. HO-REQ-ACK, indicative of at least one target secondary cell, e.g. a target secondary cell group comprising at least one target secondary cell, upon reception of the request information, e.g. HO-REQ-ACK, transmitting, in step 533, an RRC configuration, e.g. RRC-reconfiguration, to UE 530, comprising, for example,
 i) measurement configuration information indicative of a measurement configuration, e.g. Modify-measurement-configuration, for a measurement on at least one target secondary cell, e.g. a target secondary cell or cell group assigned to {A1, B1, C1}, based, at least in part, on the target secondary cell information, e.g. HO-REQ-ACK,
 ii) handover configuration information indicative of a handover configuration, e.g. CHO-Configuration, for executing a handover to a target cell of target node 520-5, and
 iii) CPA configuration information indicative of a CPA configuration.

For example, measurement results of the source node 520-3 may be continued further in the target node 520-5 after handover, e.g. if it is linked to conditional PSCell addition. In this case, a reporting of measurements in handover complete may be dispensed with. Such example is also illustrated in FIG. 5a-b as "Option 3".

FIG. 5a-b illustrates an example, in which CPA is included in CHO configuration. Here, the UE 530 can continue measurement for finding potential PSCells during and/or after CHO target is accessed.

In another example, CHO configuration can also include condition to start 'associated early measurement' for its PSCells, instead of blindly starting early measurements for all PSCells. The UE may start measuring only for the PSCells candidates which were configured by the target cell (see "Option 2" in FIG. 4a-b and FIG. 5a-b) which is a likely CHO execution candidate. The "likelihood" can be implemented using another, intermediate measurement threshold, allowing the UE to determine this cell is a likely target whose CHO condition will trigger.

In another example, the UE/IoT device may follow an approach where the measurements are made in steps i.e. gradually increasing the frequency of those measurements starting with a coarse initial setting. This will ease the measurement burden on the UE. Analogically, the opposite happens for those which do not meet the threshold i.e. the measurements are performed in more relaxed manner.

In another example, target node gives the measurement related configuration, but it does not contain the CPA configuration. In this case, the target node informs the source node to include this measurement-ID in the source configuration. That is the case when PCell HO shall be triggered first, and afterwards, the new source will send the CPA configuration, which will be applied right after. These are measurements done before and/or during CHO execution. In other words, in this case, UE would provide measurement results as soon as possible in the target node after HO (CHO or regular) in order for allowing NW to configure DC/CA after HO as fast as possible i.e. UE would provide e.g. measurement results already in HO complete message). For this method also the source node may provide list of measurement ID whose measurement results are relevant for target node for decision on, for example, SN addition or CPA.

For example, for SN addition/CPA to be executed quicker (for example, for fast DC set-up and configuration on target side), some early/earlier measurements on the (candidate) target SCG can be started from the source itself (for example when the UE is still served by the source cell, before and/or during triggering the CHO execution). This means that UE may start performing the candidate (P)SCell measurements already before and/or during CHO execution to target node.

In another example, the CHO configuration contains or comprises the CPA configuration as well. In this case, the target node informs the source node to include or comprise this measurement-ID in the source configuration with the triggering condition postponed after handover execution. That is a PCell HO shall be triggered first, and then any PSCell Addition execution, or CPA, can be done, without new or additional signaling from new source about the CPA configuration (e.g. explicitly). This is the case of CPA config to set-up for one or more SCG.

In another example, the measurement results of new measurement-ID added in the RRC Reconfiguration containing or comprising the CHO configuration is also mapped to measurement-ID in the target measurement configuration linked to conditional PSCell addition. For instance, the measurement ID that is linked to conditional PSCell addition will result in triggering a measurement report to the target MN for preparing the SN as part of CPA procedure after the handover.

Figure 6:
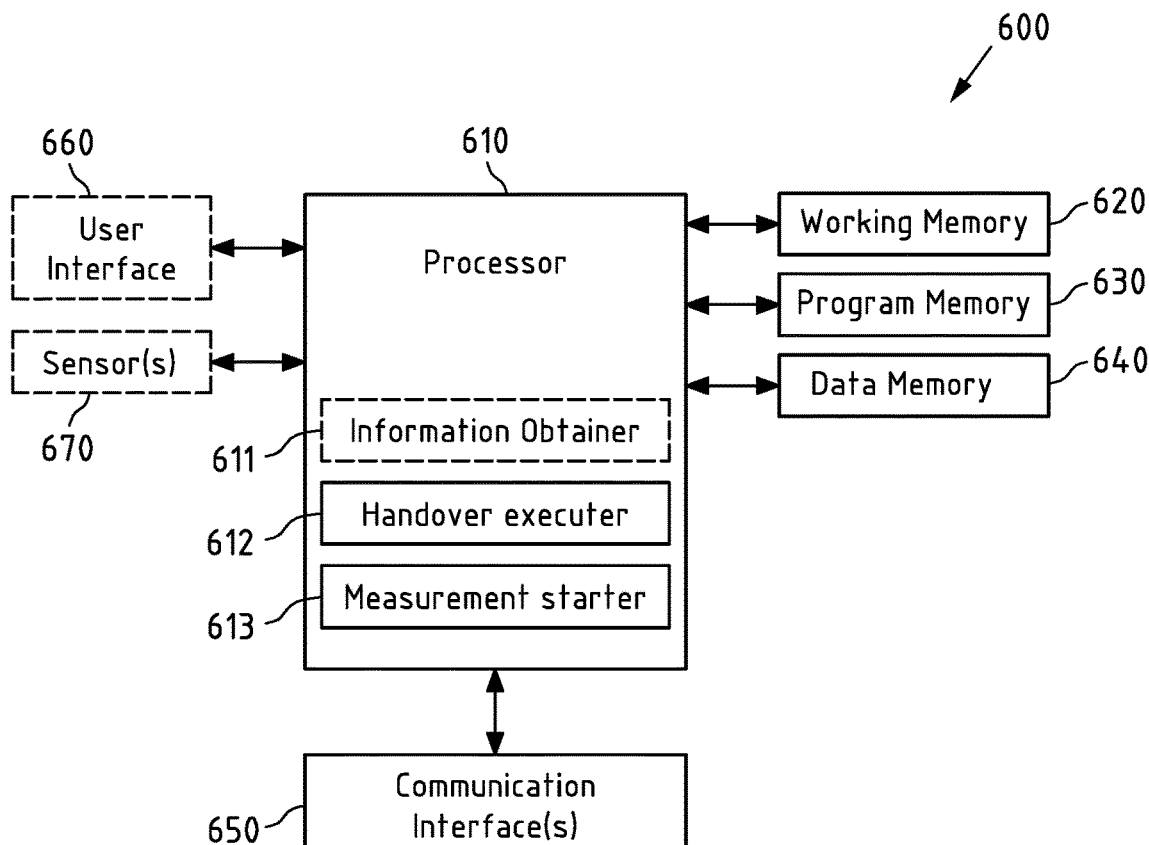
FIG. 6 a schematic block diagram of an apparatus configured to perform the method according to the first exemplary aspect.

FIG. 6 is a schematic block diagram of an apparatus 600 according to an exemplary aspect, which may for instance represent the mobile devices 130 of FIG. 1.

Apparatus 600 comprises a processor 610, working memory 620, program memory 630, data memory 640, communication interface(s) 650, an optional user interface 660 and an optional sensor(s) 670.

Apparatus 600 may for instance be configured to perform and/or control or comprise respective means (at least one of 610 to 670) for performing and/or controlling the method according to the first exemplary aspect Apparatus 600 comprising at least one processor (610) and at least one memory (620) including computer program code, the at least one memory and the computer program code configured to, with the at least one processor, cause an apparatus, e.g. apparatus 600 at least to perform and/or control the method according to method according to the first exemplary aspect.

Processor 610 may for instance comprise an information obtainer 611 as a functional and/or structural unit. Information obtainer 611 may for instance be configured to obtain (e.g. retrieve) respective information, e.g. measurement configuration information, handover configuration information, RRC configuration, CPA configuration information, or a combination thereof, to name but a few non-limiting examples.

Processor 610 may for instance comprise a handover executer 612 as a functional and/or structural unit. Handover executer 612 may for instance be configured to execute (e.g. perform and/or control) a handover.

Processor 610 may for instance comprise a measurement starter 613 as a functional and/or structural unit. Measurement starter 613 may for instance be configured to start a measurement on a target secondary cell before and/or during executing the handover.

Processor 610 may for instance further control the memories 620 to 640, the communication interface(s) 650, the optional user interface 660 and the optional sensor(s) 670.

Processor 610 may for instance execute computer program code stored in program memory 630, which may for instance represent a computer readable storage medium comprising program code that, when executed by processor 610, causes the processor 610 to perform the method according to the first exemplary aspect.

Processor 610 (and also any other processor mentioned in this specification) may be a processor of any suitable type. Processor 610 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 610 may for instance be an application processor that runs an operating system.

Program memory 630 may also be included into processor 610. This memory may for instance be fixedly connected to processor 610, or be at least partially removable from processor 610, for instance in the form of a memory card or stick. Program memory 630 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 630 may also comprise an operating system for processor 610. Program memory 630 may also comprise a firmware for apparatus 600.

Apparatus 600 comprises a working memory 620, for instance in the form of a volatile memory. It may for instance be a Random Access Memory (RAM) or Dynamic RAM (DRAM), to give but a few non-limiting examples. It may for instance be used by processor 610 when executing an operating system and/or computer program.

Data memory 640 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 640 may for instance store measurement configuration information, handover configuration information, RRC configuration, CPA configuration information, or a combination thereof, to name but a few non-limiting examples.

Communication interface(s) 650 enable apparatus 600 to communicate with other entities, e.g. with gNB 120-1 to 120-7 of FIG. 1. The communication interface(s) 650 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 600 to communicate with other entities not shown in FIG. 1.

User interface 660 is optional and may comprise a display for displaying information to a user and/or an input device (e.g. a keyboard, keypad, touchpad, mouse, etc.) for receiving information from a user.

Sensor(s) 670 are optional and may for instance comprise a barometric sensor, e.g. to gather pressure information.

Some or all of the components of the apparatus 600 may for instance be connected via a bus. Some or all of the components of the apparatus 600 may for instance be combined into one or more modules.

Figure 7:
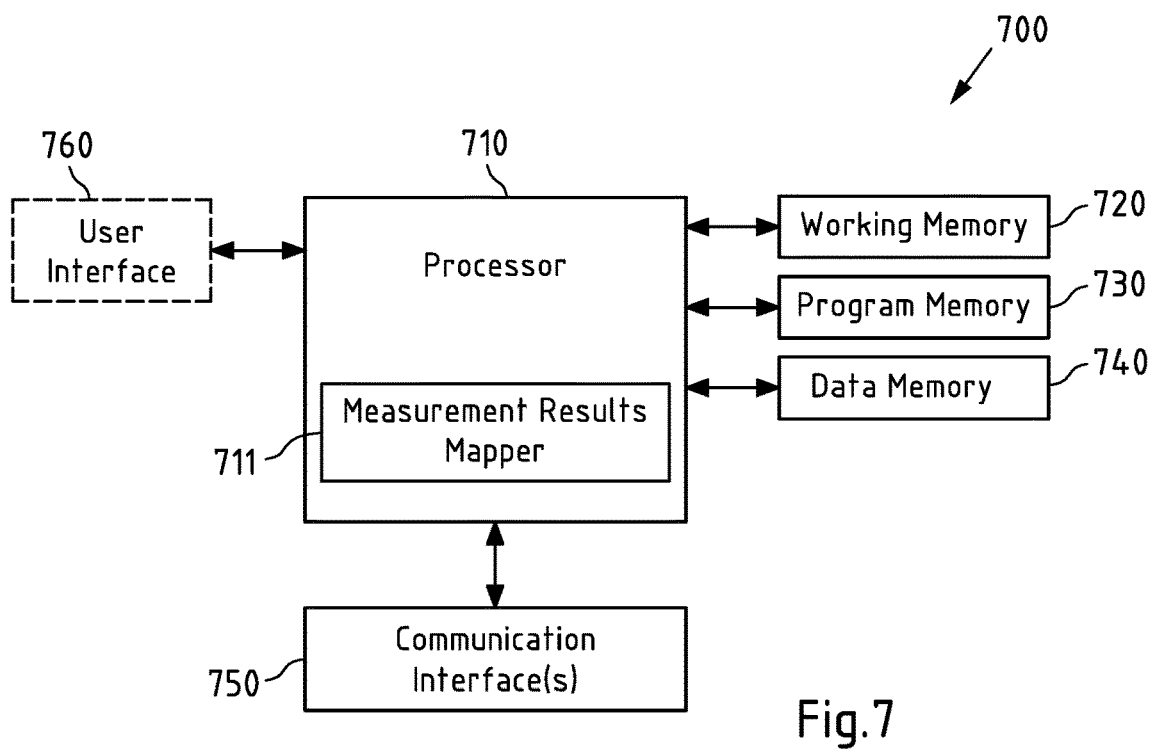
FIG. 7 a schematic block diagram of an apparatus configured to perform the method according to the second exemplary aspect.

FIG. 7 is a schematic block diagram of an apparatus 700 according to an exemplary aspect, which may for instance represent one of the gNBs 120-1 to 120-7 of FIG. 1.

Apparatus 700 comprises a processor 710, working memory 720, program memory 730, data memory 740, communication interface(s) 750, and an optional user interface 760.

Apparatus 700 may for instance be configured to perform and/or control or comprise respective means (at least one of 710 to 760) for performing and/or controlling the method according to the second exemplary aspect. Apparatus 700 may as well constitute an apparatus comprising at least one processor (710) and at least one memory (720) including computer program code, the at least one memory and the computer program code configured to, with the at least one processor, cause an apparatus, e.g. apparatus 700 at least to perform and/or control the method according to second exemplary aspect.

Processor 710 may for instance comprise measurement results mapper 711 as a functional and/or structural unit. Measurement results mapper 711 may for instance be configured to map one or more measurement results.

Processor 710 may for instance further control the memories 720 to 740, the communication interface(s) 750, the optional user interface 760 and the optional sensor(s) 770.

Processor 710 may for instance execute computer program code stored in program memory 730, which may for instance represent a computer readable storage medium comprising program code that, when executed by processor 710, causes the processor 710 to perform the method according to the second exemplary aspect.

Processor 710 (and also any other processor mentioned in this specification) may be a processor of any suitable type. Processor 710 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 710 may for instance be an application processor that runs an operating system.

Program memory 730 may also be included into processor 710. This memory may for instance be fixedly connected to processor 710, or be at least partially removable from processor 710, for instance in the form of a memory card or stick. Program memory 730 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 730 may also comprise an operating system for processor 710. Program memory 730 may also comprise a firmware for apparatus 700.

Apparatus 700 comprises a working memory 720, for instance in the form of a volatile memory. It may for instance be a Random Access Memory (RAM) or Dynamic RAM (DRAM), to give but a few non-limiting examples. It may for instance be used by processor 710 when executing an operating system and/or computer program.

Data memory 740 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 640 may for instance store measurement configuration information, handover configuration information, RRC configuration, CPA configuration information, or a combination thereof, to name but a few non-limiting examples.

Communication interface(s) 750 enable apparatus 700 to communicate with other entities, e.g. with mobile device 130 of FIG. 1. The communication interface(s) 750 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 700 to communicate with other entities, for instance with other gNBs 120-1 to 120-7 of FIG. 1.

User interface 760 is optional and may comprise a display for displaying information to a user and/or an input device (e.g. a keyboard, keypad, touchpad, mouse, etc.) for receiving information from a user.

Some or all of the components of the apparatus 700 may for instance be connected via a bus. Some or all of the components of the apparatus 700 may for instance be combined into one or more modules.

The following embodiments shall also be considered to be disclosed:

Embodiment 1

A method comprising:
obtaining measurement configuration information indicative of a measurement configuration for a measurement on at least one target secondary cell of a mobile communication network,
executing a handover to a target cell, and,
before and/or during executing the handover, starting a measurement on at least one target secondary cell based, at least in part, on the measurement configuration information.

Embodiment 2

The method according to embodiment 1, wherein
the handover is a handover from a source cell of the mobile communication network to the target cell and
obtaining the measurement configuration information includes receiving the measurement configuration information from a source node.

Embodiment 3

The method according to embodiment 1 or 2, further comprising:
obtaining a handover configuration information indicative of a handover configuration for executing a handover to the target cell.

Embodiment 4

The method according to embodiment 3, wherein:
obtaining the measurement configuration information and the handover configuration information includes receiving a radio resource control, RRC, configuration, the RRC configuration comprising the measurement configuration information and the handover configuration information.

Embodiment 5

The method according to embodiment 4, wherein:
the RRC configuration further includes a conditional PSCell addition (CPA) configuration.

Embodiment 6

The method according to any one of embodiments 1 to 5, further comprising:
after executing the handover to the target cell, obtaining a CPA configuration.

Embodiment 7

The method according to any one of embodiments 1 to 6, wherein
the measurement configuration information is indicative of one or more than one measurement identifiers, IDs, each measurement ID being indicative of a measurement configuration for a measurement on a respective target secondary cell.

Embodiment 8

The method according to embodiment 7, further comprising:
mapping measurement results of the measurement identifiers to target measurement identifiers in a target measurement configuration.

Embodiment 9

The method according to any one of embodiments 1 to 8, further comprising:
after execution of the handover, transmitting measurement result information indicative of a result of the measurement.

Embodiment 10

The method according to embodiment 9, further comprising:
after execution of the handover, transmitting a handover complete message indicative of the completion of the handover, wherein the handover complete message includes the measurement result information.

Embodiment 11

The method according to any one of embodiments 6 to 10, further comprising:
after execution of the handover, activation of dual connectivity based, at least in part, on the CPA configuration.

Embodiment 12

The method according to any one of embodiments 1 to 11, wherein obtaining measurement configuration information, executing the handover and/or starting the measurement is carried out on or with a mobile device and/or an Internet-of-Things, IoT device.

Embodiment 13

A method comprising:
receiving, from a target node, target secondary cell information indicative of at least one target secondary cell,
upon reception of the target secondary cell information, transmitting a measurement configuration information indicative of a measurement configuration for a measurement on at least one target secondary cell based, at least in part, on the target secondary cell information.

Embodiment 14

The method according to embodiment 13, wherein:
the target secondary cell information and/or the measurement configuration information include one or more than one measurement identifiers.

Embodiment 15

The method according to embodiment 14, further comprising:
mapping the of measurement identifiers to source measurement identifiers in a source measurement configuration.

Embodiment 16

The method according to any one of embodiments 13 to 15, further comprising:
receiving, after transmitting the measurement configuration information, a handover success information indicative of a successful handover to the target node.

Embodiment 17

The method according to any one of embodiments 13 to 16, wherein the method is carried out on or with a source master node of the mobile communication network.

Embodiment 18

A tangible computer-readable medium storing computer program code, the computer program code when executed by a processor causing an apparatus to perform and/or control:
obtaining measurement configuration information indicative of a measurement configuration for a measurement on at least one target secondary cell of a mobile communication network,
executing a handover to a target cell, and,
before and/or during executing the handover, starting a measurement on at least one target secondary cell based, at least in part, on the measurement configuration information.

Embodiment 19

The tangible computer-readable medium according to embodiment 18, the computer program code when executed by a processor causing an apparatus to perform and/or control:
the handover is a handover from a source cell of the mobile communication network to the target cell and
obtaining the measurement configuration information includes receiving the measurement configuration information from a source node.

Embodiment 20

The tangible computer-readable medium according to embodiment 18 or 19, the computer program code when executed by a processor causing an apparatus to perform and/or control:
obtaining a handover configuration information indicative of a handover configuration for executing a handover to the target cell.

Embodiment 21

The tangible computer-readable medium according to any one of embodiments 20, the computer program code when executed by a processor causing an apparatus to perform and/or control:
obtaining the measurement configuration information and the handover configuration information includes receiving a radio resource control, RRC, configuration, the RRC configuration comprising the measurement configuration information and the handover configuration information.

Embodiment 22

The tangible computer-readable medium according to embodiment 21, the computer program code when executed by a processor causing an apparatus to perform and/or control:
the RRC configuration further includes a conditional PSCell addition (CPA) configuration.

Embodiment 23

The tangible computer-readable medium according to any one of embodiments 18 to 22, the computer program code when executed by a processor causing an apparatus to perform and/or control:
after executing the handover to the target cell, obtaining a CPA configuration.

Embodiment 24

The tangible computer-readable medium according to any one of embodiments 18 to 23, the computer program code when executed by a processor causing an apparatus to perform and/or control:
the measurement configuration information is indicative of one or more than one measurement identifiers, IDs, each measurement ID being indicative of a measurement configuration for a measurement on a respective target secondary cell.

Embodiment 25

The tangible computer-readable medium according to embodiment 24, the computer program code when executed by a processor causing an apparatus to perform and/or control:
mapping measurement results of the measurement identifiers to target measurement identifiers in a target measurement configuration.

Embodiment 26

The tangible computer-readable medium according to any one of embodiments 18 to 25, the computer program code when executed by a processor causing an apparatus to perform and/or control:
after execution of the handover, transmitting measurement result information indicative of a result of the measurement.

Embodiment 27

The tangible computer-readable medium according to embodiments 26, the computer program code when executed by a processor causing an apparatus to perform and/or control:
after execution of the handover, transmitting a handover complete message indicative of the completion of the handover, wherein the handover complete message includes the measurement result information.

Embodiment 28

The tangible computer-readable medium according to any one of embodiments 22 to 27, the computer program code when executed by a processor causing an apparatus to perform and/or control:
after execution of the handover, activation of dual connectivity based, at least in part, on the CPA configuration.

Embodiment 29

A tangible computer-readable medium storing computer program code, the computer program code when executed by a processor causing an apparatus to perform and/or control:
receiving, from a target node, target secondary cell information indicative of at least one target secondary cell, upon reception of the target secondary cell information, transmitting a measurement configuration information indicative of a measurement configuration for a measurement on at least one target secondary cell based, at least in part, on the target secondary cell information.

Embodiment 30

The tangible computer-readable medium according to embodiment 29, the computer program code when executed by a processor causing an apparatus to perform and/or control:
the target secondary cell information and/or the measurement configuration information include one or more than one measurement identifiers.

Embodiment 31

The tangible computer-readable medium according to embodiment 30, the computer program code when executed by a processor causing an apparatus to perform and/or control:
mapping the measurement identifiers to source measurement identifiers in a source measurement configuration.

Embodiment 32

The tangible computer-readable medium according to any one of embodiments 29 to 31, the computer program code when executed by a processor causing an apparatus to perform and/or control:
receiving, after transmitting the measurement configuration information, a handover success information indicative of a successful handover to the target node.

Embodiment 33

An apparatus comprising at least one processor and at least one memory including computer program code, the at least one memory and the computer program code configured to, with the at least one processor, cause an apparatus at least to perform and/or control the method of the first exemplary aspect.

Embodiment 34

An apparatus comprising at least one processor and at least one memory including computer program code, the at least one memory and the computer program code configured to, with the at least one processor, cause an apparatus at least to perform and/or control the method of the second exemplary aspect.

Example embodiments may thus be utilized to enable enhancements and solutions necessary to support high accuracy (e.g. horizontal and/or vertical), low latency, network efficiency (scalability, RS overhead, etc.) and device efficiency (power consumption, complexity) requirements for commercial uses cases (including general commercial use cases and specifically (I)IoT use cases.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of one of the enumerated features is possible. The specific combination of all subsequently enumerated features may as well be considered. Also, a plurality of one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

With the invention and its different aspects described herein, it may for example be possible to achieve one or more of the following:

Enablement for fast set-up and configuration of DC in candidate target gNB,

Target node may do better decision whether to activate or not the DC, based on early measurements, Target may have more accurate knowledge of the measurements needed to configure and activate DC.

The invention claimed is:

1. An apparatus, comprising:
   at least one processor; and
   at least one memory including computer program code, the at least one memory and the computer program code configured to, with the at least one processor, cause the apparatus to at least perform:
      obtaining, from a source master node, measurement configuration information indicative of a measurement configuration for a measurement on at least one target secondary cell of a mobile communication network;
      executing a handover from a source primary cell of the source master node to a target primary cell of a target master node;
      before and/or during executing the handover, starting a measurement on at least one target secondary cell based, at least in part, on the measurement configuration information; and
      after execution of the handover, transmitting, to the target master node, measurement result information indicative of a result of the measurement.

2. The apparatus according to claim 1, wherein the handover comprises a handover from a source cell of the mobile communication network to the target cell, and wherein
   obtaining the measurement configuration information includes receiving the measurement configuration information from the source master node.

3. The apparatus according to claim 1, wherein the at least one memory and the computer program code are configured to, with the at least one processor, cause the apparatus further to perform:
   obtaining a handover configuration information indicative of a handover configuration for executing a handover to the target cell.

4. The apparatus according to claim 3, wherein
   obtaining the measurement configuration information and the handover configuration information includes receiving a radio resource control, RRC, configuration, the RRC configuration comprising the measurement configuration information and the handover configuration information.

5. The apparatus according to claim 4, wherein
   the RRC configuration further includes a conditional PSCell addition (CPA) configuration.

6. The apparatus according to claim 1, wherein the at least one memory and the computer program code are configured to, with the at least one processor, cause the apparatus further to perform,
    after executing the handover to the target cell, obtaining a CPA configuration.

7. The apparatus according to claim 1, wherein
the measurement configuration information is indicative of one or more than one measurement identifiers, IDs, each measurement ID being indicative of a measurement configuration for a measurement on a respective target secondary cell.

8. The apparatus according to claim 7, wherein the at least one memory and the computer program code are configured to, with the at least one processor, cause the apparatus further to perform:
    mapping measurement results of the measurement identifiers to target measurement identifiers in a target measurement configuration.

9. The apparatus according to claim 1, wherein the at least one memory and the computer program code are configured to, with the at least one processor, cause the apparatus further to perform:
    transmitting the measurement result information indicative of the result of the measurement in a reconfiguration complete message.

10. The apparatus according to claim 1, wherein the at least one memory and the computer program code are configured to, with the at least one processor, cause the apparatus further to perform,
    after execution of the handover, transmitting a handover complete message indicative of the completion of the handover, wherein the handover complete message includes the measurement result information.

11. The apparatus according to claim 5, wherein the at least one memory and the computer program code are configured to, with the at least one processor, cause the apparatus further to perform,
    after execution of the handover, activation of dual connectivity based, at least in part, on the CPA configuration.

12. The apparatus according to claim 1, wherein the apparatus comprises or is part of a mobile device and/or an Internet-of-Things, IoT device.

13. An apparatus, comprising:
    at least one processor; and
    at least one memory including computer program code, the at least one memory and the computer program code configured to, with the at least one processor, cause the apparatus to at least perform:
    receiving, from a target master node, target secondary cell information indicative of at least one target secondary cell; and
    upon reception of the target secondary cell information, transmitting, to a user equipment, a measurement configuration information indicative of a measurement configuration for a measurement on at least one target secondary cell based, at least in part, on the target secondary cell information, wherein the measurement configuration causes the user equipment to, after executing a handover from a source primary cell of the source master node to a target primary cell of the target master node, transmitting measurement result information indicative of a result of measurement on the at least one target secondary cell.

14. The apparatus according to claim 13, wherein:
the target secondary cell information and/or the measurement configuration information include one or more than one measurement identifiers.

15. The apparatus according to claim 14, wherein the at least one memory and the computer program code are configured to, with the at least one processor, cause the apparatus further to perform:
    mapping the measurement identifiers to source measurement identifiers in a source measurement configuration.

16. The apparatus according to claim 13, wherein the at least one memory and the computer program code are configured to, with the at least one processor, cause the apparatus further to perform:
    receiving, after transmitting the measurement configuration information, a handover success information indicative of a successful handover to the target master node.

17. The apparatus according to claim 13, wherein the apparatus comprises or is part of a source master node of the mobile communication network.

18. A system, comprising:
    at least one apparatus according to claim 1; and
    at least one other apparatus, comprising:
    at least one other processor; and
    at least one other memory including other computer program code, the at least one other memory and the other computer program code configured to, with the at least one other processor, cause the other apparatus to at least perform:
    receiving, from the target master node, the target secondary cell information indicative of the at least one target secondary cell; and
    upon reception of the target secondary cell information, transmitting, to the apparatus, the measurement configuration information indicative of the measurement configuration for the measurement on at the least one target secondary cell based, at least in part, on the target secondary cell information, wherein the measurement configuration causes the apparatus to, after executing the handover from the source primary cell of the source master node to the target primary cell of the target master node, transmitting the measurement result information indicative of the result of measurement on the at least one target secondary cell.

\* \* \* \* \*